(12) United States Patent
Dultz et al.

(10) Patent No.: US 6,282,333 B1
(45) Date of Patent: Aug. 28, 2001

(54) METHOD AND DEVICE TO COMPENSATE FOR POLARIZATION MODE DISPERSION IN AN OPTICAL TRANSMISSION LINK

(75) Inventors: Wolfgang Dultz, Frankfurt am Main (DE); Leonid Beresnev, Columbia, MD (US); Heidrun Schmitzer, Regensburg (DE); Bernhard Hils, Koenigstein (DE); Joachim Vobian, Muehltal (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/285,118

(22) Filed: Apr. 1, 1999

(30) Foreign Application Priority Data

Apr. 1, 1998 (DE) ............................... 198 14 497

(51) Int. Cl.$^7$ ............................... G02B 6/126; G02B 6/27
(52) U.S. Cl. ............................... 385/11; 385/123; 359/161
(58) Field of Search ............................... 385/11, 13, 28, 385/123; 359/161, 494, 499

(56) References Cited

U.S. PATENT DOCUMENTS

| 4,341,442 | * | 7/1982 | Johnson | 385/11 |
| 4,529,262 | * | 7/1985 | Ashkin et al. | 385/11 |
| 5,600,738 | | 2/1997 | Bergland et al. | 385/11 |
| 5,659,412 | | 8/1997 | Hakki | 359/156 |

FOREIGN PATENT DOCUMENTS 0 805 372   11/1997   (EP) ............................... G02F/1/125

OTHER PUBLICATIONS

"Component for Second–Order Compensation of Polarization–Mode Dispersion", Electronic Letters, by J. Patscher and R. Eckardt, vol. 33, No. 13, p. 1157.* (copy here is that which is reprinted from Electronic Letters on the web at http://www.om.tu–harburg.de by the permission of IEE).

Spectral Determination of Modal Birefringence and Polarization Dispersion of Polarization–Maintaining Fibers with a high Accuracy, by Ch. Chojetzki, J. Vobian, W. Dultz, J. Opt. Commun. 13 (1992) 4, pp. 140–145.

* cited by examiner

Primary Examiner—Jon Henry
(74) Attorney, Agent, or Firm—Kenyon & Kenyon

(57) ABSTRACT

A method and a device are described to compensate for polarization mode dispersion in an optical transmission link(9, 9') having polarization-dependent transmission characteristics, in particular in optical fibers and cables with not only statistical, but preferred birefringence. A compensation element (1, 1', 1"), whose length is adjusted non-destructively using an interference device (2, 2', 2"), in particular a pressure mechanism, is connected upstream or downstream from the transmission link (9, 9'). The polarization states $P_L$ and $P_S$ of the compensation element are mixed by the interference and thus the length of the compensation fiber is defined at which a propagation time difference between the partial waves of polarization states $P_L$ and $P_S$ is increased or decreased so that it compensates for the propagation time difference τ within the transmission link (9, 9').

31 Claims, 4 Drawing Sheets

METHOD AND DEVICE TO COMPENSATE FOR POLARIZATION MODE DISPERSION IN AN OPTICAL TRANSMISSION LINK

FIELD OF THE INVENTION

The present invention relates to a method and a device to compensate for polarization mode dispersion in an optical transmission link having polarization-dependent transmission characteristics, in particular in optical fibers and cables with not only statistical, but preferred birefringence.

BACKGROUND OF THE INVENTION

Optical glass fibers and optical cables are not in general optically isotropic, but exhibit a small residual birefringence, which may be caused by a slight core ellipticity, or by bending and coiling of the fibers. This residual birefringence varies more or less statistically over the length of the fiber and can be described in simple models using a binomial distribution. The polarization modes of light split more and more from one fiber segment to the other, pass through the birefringent fiber segment as fast or slow natural waves and split again, forming new waves in the next fiber segment. A certain group propagation time (group delay) corresponds to each path; the distribution of all of these propagation times has a half-value width, which is proportional to the square root of the number of fiber segments, and therefore to the square Toot of the fiber length. This is one characteristic of the binomial distribution.

The limits of the distribution are determined by the paths in the fiber in which light has passed through each birefringent fiber segment in the fast polarization mode or in the slow polarization mode. In about the average propagation time, light has passed through approximately one-half of the fiber segments in the fast polarization mode and the other half in the slow polarization mode. The individual fiber segments are not identical; their length, relative delay, and axis orientation may vary.

The different propagation times of the polarization modes disperse an optical pulse injected into a glass fiber with arbitrary polarization, as it passes through the fiber. In particular, in the case of digital transmission in the 10 GHz range, polarization mode dispersion results in an interference factor which limits the maximum transmission rate and/or the size of the system due to the dispersion of an optical pulse. The dispersion of the polarization modes of conventional glass fibers limits the capacity of many optical systems such as high-speed transmission links or broad-band delay-line structures.

Optical compensation of polarization mode dispersion must retard the components of an optical pulse that were faster than the mean and speed up the components that were slower than the mean. In the case of statistically independent evenly distributed orientations of the birefringent axes within an optical transmission link, compensation cannot be successfull unless the pulse is made to return through the entire fiber with orthogonal polarization. However, this is not acceptable in telecommunication, since the undistorted signal would then appear at the input, rather than the output, of the fiber.

It has been found, however, that not all optical fibers and cables with a high polarization mode dispersion have a statistically independent evenly distributed orientation of the birefringent axes, since cables are bent in general on cable supports in a preferred direction, for example, vertically and horizontally. For such optical transmission links, the axis orientations of the individual birefringent fiber segments are predominantly horizontal or vertical, so that the transmission signal has two main polarization states $P_{U,S}$ and $P_{U,L}$, which are orthogonal to each other. Due to statistical fluctuations, however, the transmitted signal also has polarization components other than $P_{U,S}$ or $P_{U,L}$, but the distributions are concentrated around $P_{U,S}$ and $P_{U,L}$.

A particularly large polarization mode dispersion can be caused by local ellipticity of the fiber core. Even such a birefringence can have a preferred direction in space and therefore can be compensated for. A single polarization mode passes through many fiber segments only in the fast or slow mode, without being significantly dispersed at the input. Usually both polarization modes $P_{U,S}$ and $P_{U,L}$ are injected at the input of the transmission link; these exhibit no crosstalk into the other polarization channel over the entire length of the cable and exit the cable as two separate pulses at different times. The propagation time difference of this pulse can be compensated for in principle.

Partial compensation of polarization dispersion is possible if two predominant polarization states $P_{U,S}$ and $P_{U,L}$ that are orthogonal to each other and have different group propagation times still exist, although some statistical pulse dispersion occurs.

U.S. Pat. No. 5,600,738 deals with the topic of polarization mode dispersion in optical devices, in particular in optical switches and coupling elements for optical fibers. These are preferably made of highly birefringent materials such as lithium niobate ($LiNbO_3$) and result in a strong distortion of an optical pulse as a result of the different propagation times for the fast and slow polarization modes for any input polarization of the pulse. Without compensating the polarization mode dispersion, the total length of these elements within an optical transmission link is a limiting factor for their transmission capacity. U.S. Pat. No. 5,600,738 suggests that, in order to compensate for polarization mode dispersion, the optical element be formed by two or more substrates coupled together so that the polarization dispersion generated in one substrate is compensated for in the other one. For example, two birefringent pieces of crystal may be used for this purpose, coupled together so that the fast polarization state of one crystal is projected onto the slow polarization state of the other crystal and vice-versa, so that the combined element has an overall polarization dispersion approximately equal to zero. If the material is the same, the pieces of crystal preferably have the same length; if the materials are different, they must be selected so that the propagation time differences cancel each other. Although polarization dispersion due to birefringent coupling elements and/or switches between optical fibers or cables can be compensated for with the method suggested by U.S. Pat. No. 5,600,738, polarization dispersion due to the slight birefringent properties of the glass fibers within the transmission link cannot be eliminated with this method.

In order to compensate for the polarization dispersion of a transmission link, one can determine the two characteristic directions of polarization $P_{U,S}$ and $P_{U,L}$ at its output and measure the respective group propagation times, and hence the propagation time difference between the polarization components $P_{U,S}$ and $P_{U,L}$. Compensation of polarization dispersion can be achieved if the two characteristic polarization directions are split at the output of the transmission link using a polarizing beam splitter, with the different group propagation times being compensated for by introducing optical propagation time segments in one or both partial beam paths. Subsequently the partial beam paths are recombined using a polarizing coupler.

In J. Patscher, R. Eckardt, *Electronics Letters*, vol.33, no.13, p.1157, it is shown that polarization-maintaining fibers can be used for compensation. Polarization-maintaining fibers are strongly birefringent, usually due to an elliptical core. Thus a propagation time difference between the polarization components $P_S$ and $P_L$ of such a fiber compensating for the propagation time difference between the main polarization components $P_{U,S}$ and $P_{U,L}$ of the transmission link can be produced with a relatively short piece of the compensation fiber. To achieve this, the polarization mode dispersion (or propagation time difference) of the transmission link must be measured, the correct length of the compensation fiber calculated, the compensation fiber cut off and spliced in the proper orientation, so that the previously too fast polarization component is slowed down and vice-versa. The problem with this method is the relatively complex measurements needed to determine the propagation time difference and thus the correct fiber length, as well as to determine the main polarization states $P_{U,S}$ and $P_{U,L}$ of the transmission link to choose the correct orientation of the compensation fiber. Once the compensation fiber has been prepared, no further adjustment to correct for errors in the calculated orientation is possible.

SUMMARY OF THE INVENTION

An the object of the present invention is to provide a method with which compensation of the polarization mode dispersion of an optical transmission link, in particular of a glass fiber having anisotropic, not only statistical birefringence, can be non-destructively performed without previous measurements of the propagation time difference and/or the polarization characteristics of the transmission link being required. Furthermore, the present invention also provides an appropriate device to compensate for the polarization mode dispersion.

The present invention provides a method of compensating for the polarization mode dispersion in an optical transmission link having an input E and an output A, and having polarization-dependent transmission characteristics, using the following steps: a birefringent compensation element is arranged upstream or downstream from the optical transmission link with the compensation element having an input E', and output A', fast and slowly transmitted polarization eigenstates $P_S$ and $P_L$ and length $L_O$.

Depending on whether the compensation element is located upstream or downstream from the transmission link, the signal transmitted or to be transmitted over the transmission link is injected differently into the compensation element: If the compensation element is located upstream from the transmission link, injection is performed so that polarization $P_O$ of the transmission signal is the same as one of the polarization states $P_S$ or $P_L$ of the compensation element. If the compensation element is located downstream from the transmission link, the polarization states $P_{U,S}$ and $P_{U,L}$ of the slow and fast components of the transmission signal are projected onto one of the polarization states $P_S$ or $P_L$ of the compensation element.

Furthermore, an interference signal is applied to the compensation element to couple the intensity contained in polarization modes $P_S$ or $P_L$ into the other polarization state; this interference signal is capable of locally modifying the birefringence of the element.

The compensation element is coupled to the transmission link so that the polarization eigenstates $P_S$ and $P_L$ of the compensation element are changed by the transmission link into polarization states $P_{U,S}$ and $P_{U,L}$ if the compensation element is located upstream from the transmission link, or the polarization states $P_{U,S}$ and $P_{U,L}$ of the slow and fast components of the transmission signal are projected onto the polarization eigenstates $P_S$ and $P_L$ at input E of the compensation element if the compensation element is located downstream from the transmission link.

The present invention also provides a device for compensating polarization mode dispersion in an optical transmission link having polarization-dependent transmission characteristics that has the following components: a compensation element located upstream or downstream from the optical transmission link; and a device for applying an interference signal capable of locally modifying the birefringence of the element, and which is located at an approximate distance 1 from input E' of the compensation element. Furthermore, the device has one or more polarization converting elements for adjusting the polarization of the transmission signal to polarization states $P_S$ or $P_L$ of the compensation element and vice-versa.

A polarization-maintaining fiber (compensation fiber) is preferably used as polarization-maintaining birefringent element for optical compensation of polarization mode dispersion. Adjustment is usually not performed by cutting the fiber, but by defining the piece of the compensation fiber for effectively generating a propagation time difference through locally modified birefringence using an elasto-optical, magneto-optical and/or electro-optical method or some other non-destructive adjustment method. After adjustment, the fiber can be cut off at the point nondestructively determined in this manner.

A further embodiment of the present invention provides a polarization converting element that includes electro-optical liquid crystal cells. A further embodiment of the present invention provides a polarization converting element that includes electro-optical Kerr or Pockel cells.

If the transmission signal is injected into the compensation fiber in the specific polarization state $P_S$ or $P_L$, part of the intensity is changed to the other state $P_L$ or $P_S$ by the interference at a distance 1 from input E' of the fiber; a phase difference or propagation time difference between the partial waves with polarization states $P_L$ or $P_S$ is now induced on the remaining length ($L_O$–1) of the fiber segment due to the different propagation velocities of the polarization modes. This propagation time difference depends, among other things, on the length ($L_O$–1) and the difference between the refraction indices $n_o$ and $n_e$ of the ordinary and extraordinary beam within the birefringent material. By selecting the point of interference, the propagation time difference within the compensation element can thus be adjusted to the propagation time difference between the main polarization states $P_{U,S}$ and $P_{U,L}$ of the transmission link.

The polarization-maintaining element, in particular, the compensation fiber, can be located upstream or downstream from the transmission link; compensation for the polarization dispersion being possible in either case.

If the compensation element is located upstream from the transmission link, the polarization of the transmission signal is projected on one of the two main polarization states $P_S$ or $P_L$ at the input of the compensation element, $P_S$ and $P_L$ usually being linear polarization states. The polarization of the signal source is selected to be $P_S$ and $P_L$ accordingly, which can also be done by appropriately orienting the compensation element with respect to the signal source or projected onto the polarization state $P_S$ or $P_L$ using a polarization converting element. At the input of the transmission link the fast polarization state $P_S$ of the compensation fiber is again adjusted to the slow polarization state $P_{U,L}$ of the transmission link and vice versa, using an additional polarization converting element, after the signal has passed through the compensation element. Adjustment by modifying the orientations of the transmission link and fiber is usually not easily accomplished, since $P_{U,L}$ and $P_{U,S}$ are elliptical, and not necessarily linear polarization states. Therefore, adjustment is usually performed with a birefringent delay element, which allows the mutual conversion of any desired polarization states, for example, a Kerr cell, a Pockel cell or an arrangement of $\lambda/4$ and $\lambda/2$ plates, which can be activated and rotated preferably electronically. With an arrangement of a $\lambda/4-\lambda/2-\lambda/4$ sequence of plates, all desired elliptic polarization states can be mutually converted and thus all points of the Poincare sphere can be attained.

If the compensation element is located downstream from the transmission link, the main polarization states $P_{U,L}$ and $P_{U,S}$ of the transmission link are projected onto the polarization eigenstates $P_S$ and $P_L$, respectively, at the input of the compensation element, the fast component $P_{U,S}$ being projected onto the slow component $P_L$ and vice versa. Adjustment is preferably performed with the help of a polarization converting element. The interference signal sets a mixture of polarization components $P_S$ and $P_L$ so that the overall intensity is in one of the states $P_S$ or $P_L$ and thus no further increase or decrease in the phase difference or propagation time difference between the partial waves takes place. If the interference is located at a distance 1 from input E' of the compensation element, the effective segment of the compensation element is exactly 1, which can be adjusted experimentally without destroying compensation element 1. After adjusting 1, the compensation fiber can be cut off at this point and the interference can be removed.

Another embodiment of the present invention provides an interference device which includes at least one of a capacitor and a coil for generating at least one of an electric, magnetic and gradient field acting locally upon the compensation element.

DETAILED DESCRIPTION

Figure 1:
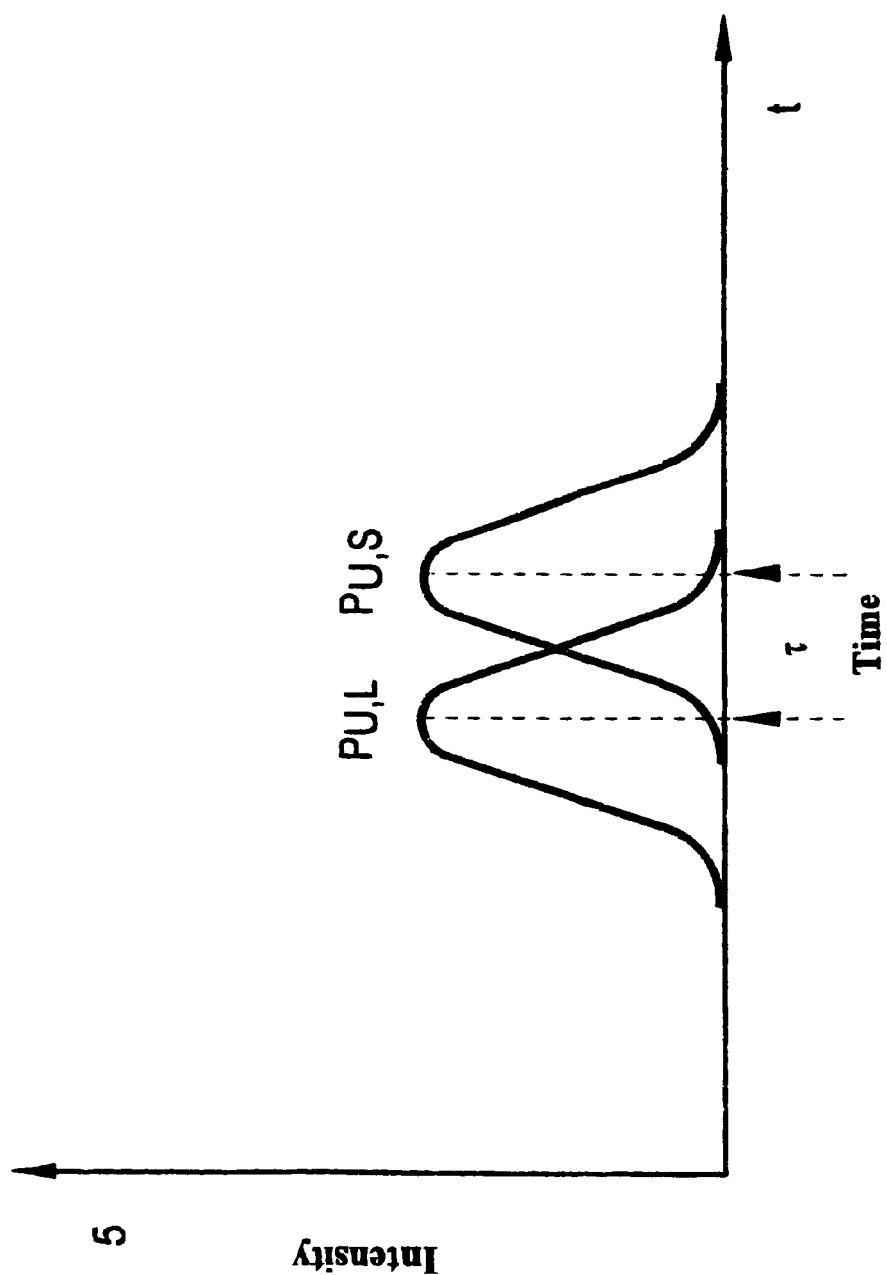
FIG. 1 shows an example of an optical signal distorted due to polarization mode dispersion.

FIG. 1 shows an example of an optical signal that is distorted over time due to polarization mode dispersion; such a signal is obtained when, for example, a shorter light pulse (delta pulse) is transmitted over a transmission link having at least partially anisotropic birefringence. The light pulse having polarization $P_O$ is split up as a result of the birefringent properties into two main polarization components $P_{U,S}$ and $P_{U,L}$, which are transmitted at different speeds due to their different group propagation velocities for the respective polarization states and therefore arrive at the output of the transmission link with a time offset $\tau$. The signal resulting from the overlapping of the partial waves is thus extended in time. The intensities of the partial waves with $P_{U,S}$ and $P_{U,L}$ are not necessarily identical, so that any distortion of the output signal may occur due to the birefringent properties of the transmission link. The dispersion of the partial pulse around the main polarities $P_{U,L}$ and $P_{U,S}$ occurs by partially statistical orientation of the birefringent fiber segments within the transmission link. With the compensation method, at least the propagation time difference $\tau$ between the partial pulses can be compensated for by slowing down the faster component $P_{U,S}$.

Figure 2:
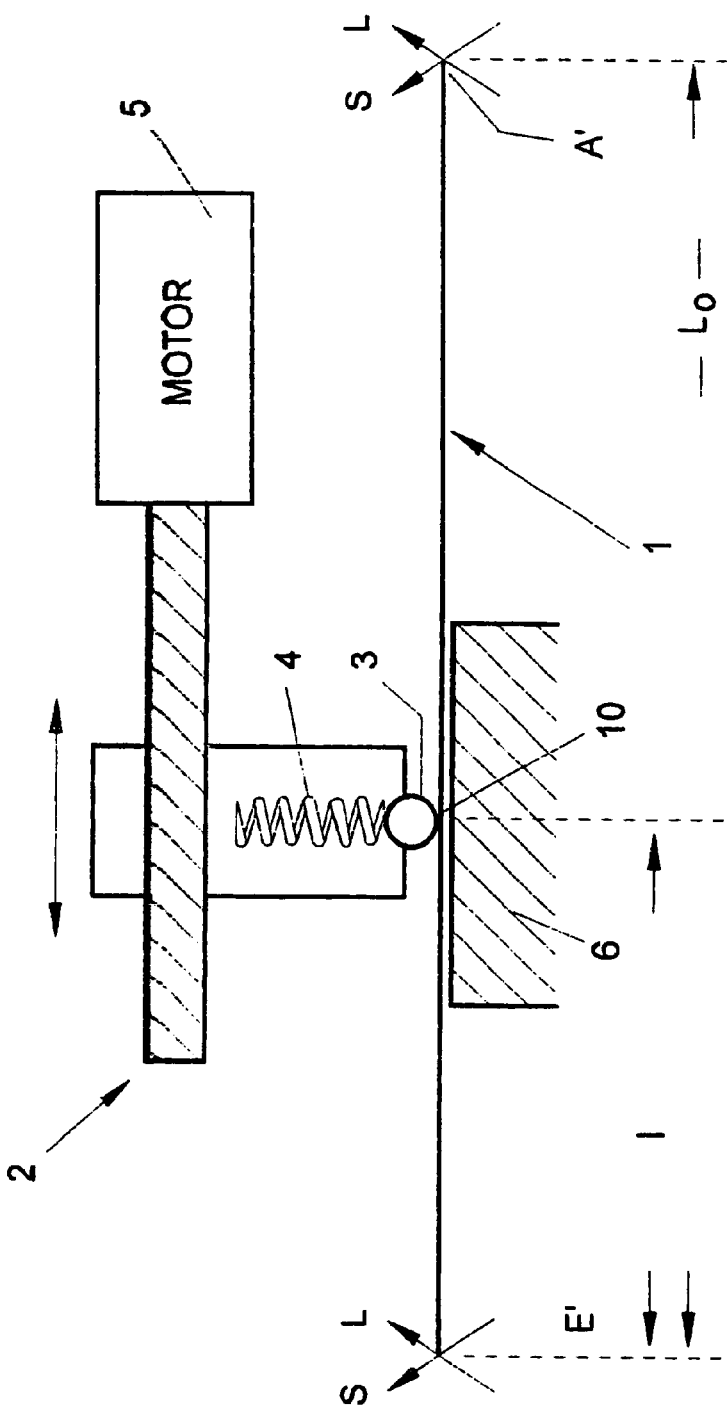
FIG. 2 shows the adjustment of a polarization-maintaining fiber using a mechanical device (pressing device)

FIG. 2 shows a compensator for compensating for the propagation time difference $\tau$ using a polarization-maintaining, strongly birefringent fiber 1 as a compensating element. Polarization-maintaining fiber 1 is used as an optical compensator for fiber segments, as is the Soleil-Babinet compensator in free-space optics. The length of polarization-maintaining fiber 1 is adjusted mechanically (using a pressing method).

The fiber 1 having length $L_O$ is placed on a table in the orientation defined by the fast and slow axes S and L, in which polarization states $P_S$ and $P_L$ are transmitted. A device 2 for the application of an interference signal in the longitudinal length of the fiber is displaceably arranged above fiber 1. The device can be moved in the axial direction using a motor 5.

A pressure wheel 3, for example, a small steel roller, presses fiber 1 through a spring 4 against a mating support 6, for example, the optical table, changing the birefringence of the fiber locally through stress and distortion. Pressure point 10 is at a distance 1 from input E' of the fiber. The direction of the force is perpendicular to the direction of the fiber and preferably offset 45° with respect to the main polarization directions of the fiber in order to achieve the greatest possible sensitivity of the coupling of the two main polarization states to the action of the force.

Light is injected at input E' of fiber 1 in one of the two main polarization directions S or L. At pressure point 10, this light is partially coupled into the other polarization eigenstate due to local distortions in the fiber and then propagates in both polarizations to output A' of the fiber. The propagation time difference accumulates on the segment having a length of $L_O-1$ between the pressure point and output A'. The ratio between the intensities of the two main polarization modes in the respective fiber segment can be modified by adjusting the pressure. The intensities are adjusted, for example, by inserting a polarizing beam splitter at the output A' of compensation fiber 1 to split the two main polarization directions $P_S$ and $P_L$. The respective intensities are each registered with a detector and the pressure applied is varied until the desired ratio is attained, e.g., approximately 1:1.

Figure 3:
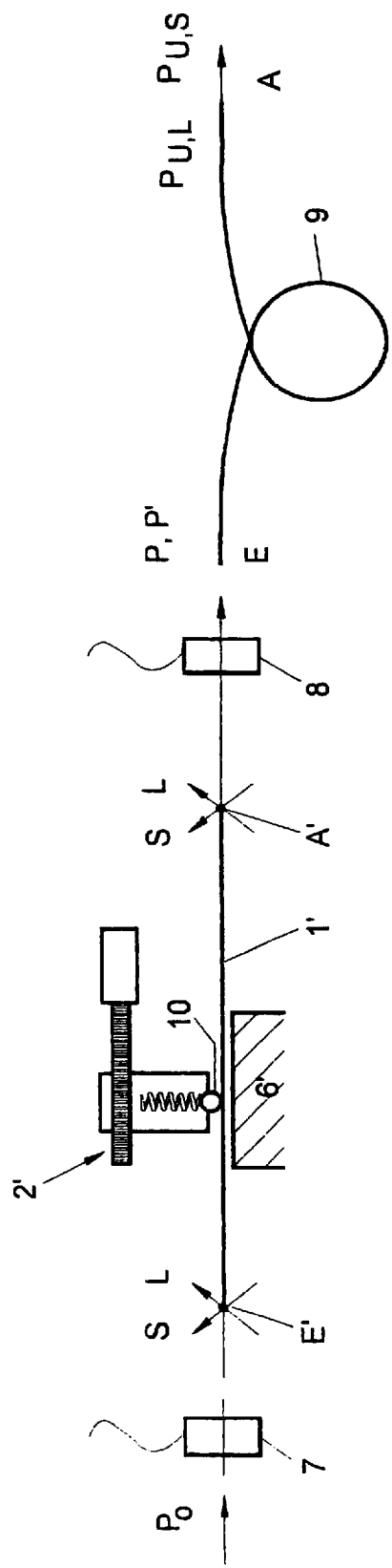
FIGS. 3 and 4 show an optical structure for compensating for the polarization mode dispersion with a compensation element upstream and downstream from the transmission link.
Figure 4:
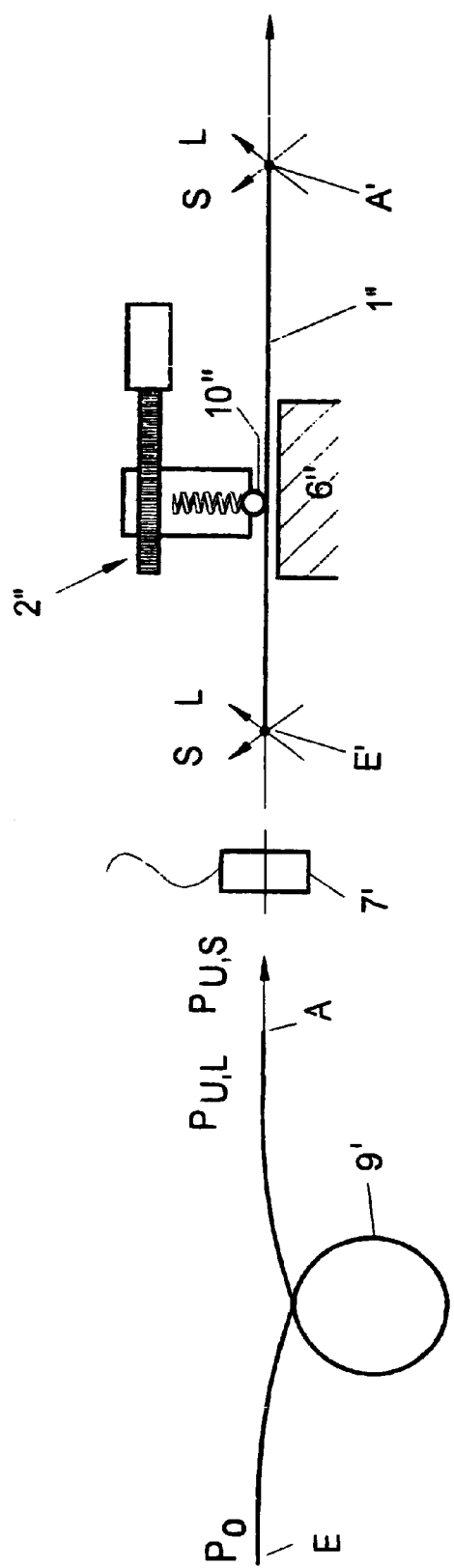

The fiber compensator according to FIG. 2 is connected upstream or downstream from the transmission link to compensate for polarization mode dispersion (FIGS. 3 and 4, respectively).

FIG. 3 shows a polarization-maintaining fiber 1' with an interference device 2' according to FIG. 2, which is connected upstream from an optical transmission link 9, for example, a glass fiber segment. The transmission link has the property of projecting a signal having any input polarization P or P' onto the output polarization $P_{U,L}$ and $P_{U,S}$ with a propagation time difference $\tau$ forming between the components with $P_{U,L}$ and $P_{U,S}$. The preferential orientation of the polarization directions $P_{U,L}$ and $P_{U,S}$ of the transmission link are not necessarily identical to main polarization directions $P_L$ and $P_S$ of the fiber compensator; the first ones are usually any desired elliptical polarization states, while the latter ones are usually linear, $P_{U,L}$ being perpendicular to $P_{U,S}$ and $P_L$ being perpendicular to $P_S$.

P and P' are the polarization states at input E of the fiber segment for which separation of the polarization mode propagation times in the fiber using the polarization of the light to be transmitted is optimum. Two pulses with the orthogonal polarization optimum states $P_{U,L}$ and $P_{U,S}$, having separate predominant orientations, appear at output A of the fiber segment. The ratios are such that P at input E of the fiber segment changes to $P_{U,S}$ at output A, which corresponds to the fast polarization mode, and P' at the input changes to $P_{U,L}$ at output A, which corresponds to the slow polarization mode.

In order to achieve compensation of the propagation time difference τ, compensation segment 1' connected upstream from the transmission link must be adjusted to the fiber segment with respect to both axis orientation and polarization state. This is accomplished using a polarization converting element 8, which has mechanically (manually, but preferably electronically) controlled adjustable delay plates. This polarization converting element 8 converts, without losses, linear polarization state $P_S$ of the fast polarization mode of compensation fiber 1' into the generally elliptical polarization state P' of the slow polarization mode at the input of the fiber segment, which is projected on $P_{U,L}$. Thus the slow mode $P_L$ of the compensation segment is also automatically projected onto the fast polarization mode at the input of the transmission link.

Subsequently, adjustment is performed using interference device 2'. In general, distance 1 and length $L_O$–1, which are relevant for forming the time difference, are determined by measuring the propagation time difference τ at the fiber segment and calculating using the known birefringence of compensation fiber 1'. Distance 1 can be determined, however, purely experimentally according to the present invention by performing a digital transmission search and determining, for example, with the help of the eye diagram, the optimum transmission during adjustment. Adjustment can also be performed by measuring the polarization mode dispersion.

It is important to inject polarized light $P_O$ coming from the signal source or from other components of the optical network at input E' of the polarization-maintaining compensation fiber 1' precisely into one of the two main polarization states S, L. This is achieved using polarization converting element 7, which is designed like element 8, for example. It is also known that an input polarization state $P_O$ that fluctuates over time can thus be automatically projected on S or L.

After adjustment, the compensation fiber can be cut off at pressure point 10' and the segment from pressure point 10' to output A' used. Pressure mechanism 2' can then be removed. In this case, polarization $P_O$ of the signal to be transmitted must be injected in the remaining compensation fiber so that components S and L have the desired intensity ratio set previously by the pressure wheel. If this intensity ratio is 1:1, the signal to be transmitted is injected in the remaining compensation fiber at 45°, for example, to the main polarization directions S and L.

FIG. 4 shows a fiber compensator according to FIG. 2, having a polarization-maintaining fiber 1" with an interference device 2", which is connected downstream from an optical transmission link 9', for example, a glass fiber segment. The design is identical to that of FIG. 3, but in this case the transmission signal with polarization $P_O$ is first injected in transmission link 9', from which it exits as a signal with polarization states $P_{U,S}$ and $P_{U,L}$, the fast polarization mode $P_{U,S}$ being again projected on the slow mode $P_L$ of compensation fiber 1" and vice versa.

The length of compensation fiber 1" is adjusted by displacing pressure device 2" in the axial direction; in this case, the fiber segment from input E' of the fiber to pressure point 10" is effective in compensating for the propagation time difference occurring in transmission link 9". After adjustment, compensation fiber 1" can therefore be cut off again at the pressure point.

Other interference signals, such as local electric or magnetic fields, heat gradients, local windings or bends of the fiber, etc., can also be used instead of pressure device 2" to allow one polarization mode to be coupled into another channel.

The method according to the present invention and the corresponding device have the advantage that the length of the fiber segment required for compensating for the propagation time difference does not need to be calculated prior to implementing it in the optical structure, but can be determined directly on the structure without destroying the compensation fiber. The interference mechanism used for this purpose, preferably a pressure mechanism, can be removed after determining the optimum settings for the given system and reused for compensating additional transmission links.

The method and device according to the present invention are advantageously used in optimizing optical transmission systems for initial compensation for polarization mode dispersion in situ non-destructively and without prior calculations of fiber length and fiber orientation. The performance of such transmission systems can be enhanced, in particular for digital data transmission, regarding signal quality and transmission rates by compensating for polarization mode dispersion.

What is claimed is:

1. A method of compensating for polarization mode dispersion in an optical transmission link having a link input and a link output and having polarization-dependent transmission characteristics, a birefringent compensation element being arranged upstream from the optical transmission link, the compensation element having an input, an output, a fast transmitting polarization state, a slow transmitting polarization state and a length, the method comprising:

sending an optical transmission signal into the compensation element so that a signal polarization of the transmission signal coincides with one of the fast or slow polarization states;

applying an interference capable of locally modifying birefringence of the compensation element to the compensation element at a distance from the input;

the compensation element being coupled to the transmission link so that the fast and slow polarization states are changed into a first altered polarization state and a second altered polarization state by the transmission link.

2. The method according to claim 1 wherein the interference is mechanical pressure, traction, and/or application of local electric and/or magnetic fields and/or heat gradients.

3. The method according to claim 1 wherein the compensation element is a strongly birefringent fiber.

4. The method according to claim 1 wherein the signal polarization is adjusted to one of the fast or slow polarization states using a polarization converting element.

5. The method according to claim 1 wherein the fast and slow polarization states of the compensation element are adjusted to a slow link and a fast link polarization state of the transmission link, respectively, with aid of a polarization converting element.

6. The method according to claim 1 wherein an intensity ratio between the fast and slow polarization states is adjusted by varying an intensity of the interference.

7. The method according to claim 1 wherein a time delay of partial waves having the fast and slow polarization states is adjusted within the compensation element as a function of the distance to a second time delay of the partial waves having slow link and fast link polarizations within the transmission link.

8. The method according to claim 7 further comprising removing the interference after adjustment of the distance, separating the compensation element at the distance and removing a part of the compensation element facing away from the transmission link, the transmission signal being sent into the compensation element so that a ratio of intensities between the fast and slow polarization modes corresponds to an intensity ratio previously set using the interference.

9. The method according to claim 1 wherein an intensity ratio between the fast and slow polarization states is 1:1 after passage through the interference device and the compensation element.

10. The method according to claim 8 or 9 wherein after the part of the compensation element facing away from the transmission link has been removed, the transmission signal is transmitted in the compensation element with a polarization that is rotated approximately 45° with respect to the slow and fast polarization states.

11. A method of compensating for polarization mode dispersion in an optical transmission link having a link input and a link output and having polarization-dependent transmission characteristics, a birefringent compensation element being arranged downstream from the optical transmission link, the compensation element having an input, an output, a fast transmitting polarization state, a slow transmitting polarization state and a length, the method comprising:
    sending an optical transmission signal into the compensation element after the transmission signal passes through the transmission link so first and second polarization states of slow and fast components of the transmission signal, respectively, coincide with one of the fast and slow polarization states of the compensation element;
    applying an interference capable of locally modifying birefringence of the compensation element is applied to the element at a distance from the input; and
    projecting the first and second polarization states of the transmission signal onto the fast and slow polarization states at the input.

12. The method according to claim 11 wherein the interference is mechanical pressure, traction, and/or application of local electric and/or magnetic fields and/or heat gradients.

13. The method according to claim 11 wherein the compensation element is a strongly birefringent fiber.

14. The method according to claim 11 wherein the fast and slow polarization states of the compensation element are adjusted to the first and second polarization states with aid of a polarization converting element.

15. The method according to claim 11 wherein an intensity ratio between the fast and slow polarization states is adjusted by varying an intensity of the interference.

16. The method according to claim 11 wherein a time delay of partial waves having the fast and slow polarization states is adjusted within the compensation element as a function of the distance to a second time delay of the partial waves having slow link and fast link polarizations within the transmission link.

17. The method according to claim 16 further comprising removing the interference after adjustment of the distance, separating the compensation element at the distance and removing a part of the compensation element facing away from the transmission link.

18. A device for compensating the polarization mode dispersion in an optical transmission link having a link input and a link output and having polarization-dependent transmission characteristics, the device comprising:
    a birefringent compensation element having an input, an output, a fast and a slow transmitting main polarization state and a length, the compensation element being arranged upstream or downstream from the optical transmission link; and
    an interference device for locally modifying birefringence of the compensation element and acting upon the compensation element at a distance from the input; and
    at least one polarization converting element, the at least one polarization converting element being arranged at at least one of:
        the input for adjusting a polarization state of a transmission signal to one of the fast and slow polarization states;
        the link output between the link output and the input for adjusting first and second polarization states of the transmission signal after passing through the transmission link to the fast and slow polarization states respectively; and
        the output between the output and the link input for adjusting the fast and slow polarization states of the transmission signal after the signal passes through the compensation element.

19. The device according to claim 18 wherein the compensation element is a polarization-maintaining fiber.

20. The device according to claim 18 wherein the compensation element is a birefringent crystal.

21. The device according to claim 20 wherein the birefringent crystal is lithium niobate.

22. The device according to claim 18 wherein the interference device is displaceable parallel to an optical axis of the compensation element.

23. The device according to claim 18 wherein the interference device is a mechanical element.

24. The device according to claim 23 wherein the mechanical element is a pressure wheel with corresponding mating supports, the pressure wheel capable of exerting a force on the compensation element.

25. The device according to claim 24 wherein the force acts parallel to a plane defined by polarization directions of the slow and fast polarization states, a direction of the force being rotated approximately 45° with respect to the slow and fast polarization states.

26. The device according to claim 24 wherein an intensity of the force is variable.

27. The device according to claim 18 wherein the interference device includes at least one of a capacitor and a coil for generating at least one of an electric, magnetic and gradient field acting locally upon the compensation element.

28. The device according to claim 18 wherein the at least one polarization converting elements includes a mechanically adjustable delay plate.

29. The device according to claim 28 wherein the adjustable delay plate is controllable electronically.

30. The device according to claim 17 wherein the at least one polarization converting element include electro-optical Kerr or Pockel cells.

31. The device according to claim 18 wherein the at least one polarization converting element includes electro-optical liquid crystal cells.

* * * * *